March 30, 1965 J. M. JOHNSON, JR., ET AL 3,175,526
AUTOMATIC ALTITUDE CONTROL SYSTEM FOR A HYDROFOIL VESSEL
Filed Feb. 27, 1961 3 Sheets-Sheet 1

INVENTORS
JOHN M. JOHNSON, JR.
RICHARD OLSHAUSEN
BY
ATTORNEY

March 30, 1965   J. M. JOHNSON, JR., ETAL   3,175,526
AUTOMATIC ALTITUDE CONTROL SYSTEM FOR A HYDROFOIL VESSEL
Filed Feb. 27, 1961   3 Sheets-Sheet 2

*INVENTORS*
JOHN M. JOHNSON, JR.
RICHARD OLSHAUSEN
BY
Edward A. Sokolski
ATTORNEY 3,175,526
AUTOMATIC ALTITUDE CONTROL SYSTEM FOR
A HYDROFOIL VESSEL
John M. Johnson, Jr., Long Beach, and Richard
Olshausen, Sunset Beach, Calif., assignors to North
American Aviation, Inc.
Filed Feb. 27, 1961, Ser. No. 92,026
20 Claims. (Cl. 114—66.5)

This invention relates to a control system for a hydrofoil vehicle, and more particularly to an automatic altitude control system.

A hydrofoil vehicle is essentially an aircraft whose wings operate under the water. The function of such a vehicle is to achieve rapid speeds over the face of the water without subjecting the hull of the vessel to buffeting and forces of wave action incident, say, to the course of an ordinary speedboat through a heavy sea. This function of the hydrofoil vessel is accomplished by using the lift achieved by a set of hydrofoils operating under the surface to support a hull above the water, the hull being mechanically connected to the hydrofoils by means of struts or similar connecting structure.

While a hydrofoil vehicle is in some respects analogous to an aircraft, there are two main differences between aircraft control and hydrofoil control. One such difference is the difference in densities of the media in which the foils operate, and a second difference is the existence of a free surface (e.g., abrupt density change in the media) relatively close to the upper surface of the hydrofoil. It is from this second difference that the critical control problem of a hydrofoil vehicle arises, namely, that of altitude control.

In addition to maintaining the hull of the hydrofoil above the water to prevent structural damage thereto due to impact with the waves, an altitude control system must also maintain the hydrofoils below the surface of the water. If the hydrofoils are allowed to operate too close to the surface of the water in a heavy sea, the foils may leave the water or break through the troughs of waves. Such action of the hydrofoils is referred to as broaching. Sudden broaching reduces lift and control stability, and may also result in structural damage to the vehicle. Therefore, broaching is to be avoided in operation of the altitude control system.

Accordingly, another distinction between an aircraft altitude control and hydrofoil vehicle altitude control is the necessity for double-valued limiting of the hydrofoil vehicle control function in that the hydrofoils must be operated below the water at all times and the hull must be supported above the water at all times.

The altitude limits within which the hull may be maintained above the water while leaving the hydrofoils below the water are limited by the dimensional limits of the vertical struts connecting the hull to the hydrofoils. In a heavy sea, altitude control to a particular height above the water within these limits leads to contouring or following the profile of the waves. The vertical distance between the height of a wave crest and the depth of the following wave trough in a heavy sea is herein referred to as the waveheight. The frequency with which the vehicle encounters succeeding wave crests is herein referred to as relative wave velocity. The existence of both waveheight and wave velocity is referred to as sea-state.

At high speeds over high waves such contouring may result in excessive heave or vertical accelerations relative to an inertial reference, which accelerations may exceed limits established by structural considerations or at least those fixed by considerations of passenger comfort. Therefore, the hydrofoils must be controlled to cut through the water to limit heave while at the same time preventing (1) broaching of the hydrofoils and (2) impact of the hull with the waves.

Since the speed of a hydrofoil which is relatively high (compared to, say, conventional craft employing a waterborne hull) and because the vertical limits within which the hull must be maintained above the water are usually small, the use of manual control is impractical. Accordingly, it is a general object of this invention to accomplish altitude control of a hydrofoil vehicle by automatic means.

In carrying out the principles of this invention in accordance with a preferred embodiment thereof, there is provided an altitude control system for achieving control of the height of the hull of a hydrofoil vehicle above the surface of the water, said control system embodying: double-valued limiting means for limiting both the upper and lower extent of such control as a function of sea-state, means for limiting normal accelerations of the vehicle, and automatic means for shutting down the system when both such height control and acceleration limiting functions cannot be automatically achieved concurrently.

With the above-described means, a hydrofoil vehicle will be enabled to automatically operate without either broaching of the hydrofoils, impact of the hull with the waves, or excessive acceleration of the vehicle under limited sea-state conditions. Where the combination of vehicle performance-limits and sea-state preclude the concurrent achievement of the above control functions, the control system may be made to automatically become inoperative, thereby allowing the vehicle to operate as a conventional water-borne hull.

An object of this invention therefore, is to maintain the hull of a hydrofoil vehicle clear of the water surface without the foils broaching said surface in the presence of sea-state conditions.

It is a further object of this invention to control wave-contouring of a hydrofoil vehicle to reduce heave and limit vertical acceleration of the vehicle.

It is also a further object to establish limits upon a reference altitude for vehicle control as a function of sea-state.

It is yet a further object of this invention to provide a variable double-valued limit for a command reference in a closed loop control system.

These and other objects of the subject invention will become apparent from the following specification taken together with the accompanying drawings in which.

Figure 6A:
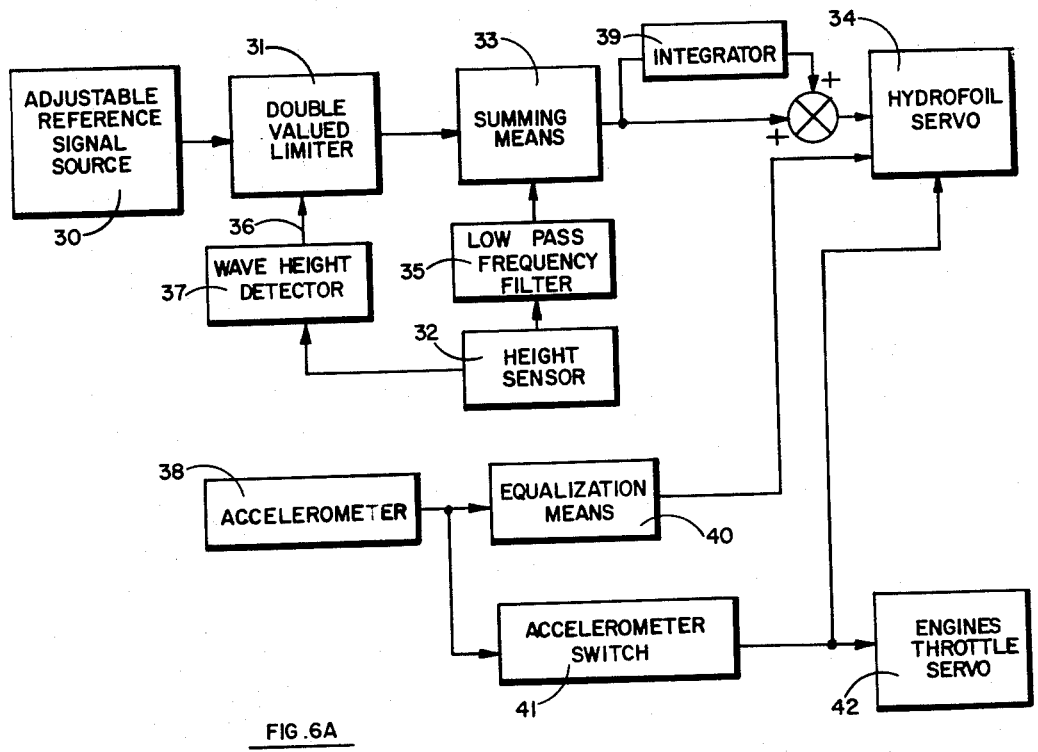
Figure 6B:
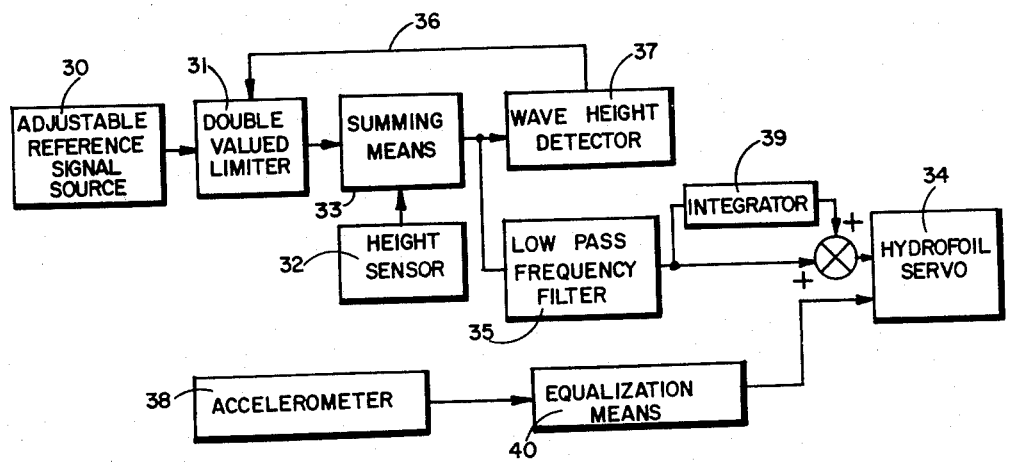

FIG. 6-A is a block diagram of a system embodying the principles of this invention.

FIG. 6-B is a block diagram of an alternate system embodying principles of this invention.

Figure 7:
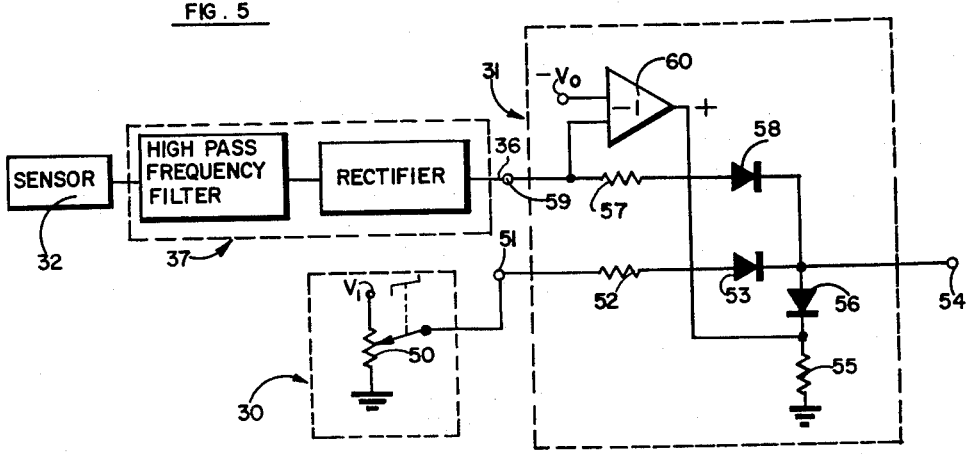

FIG. 7 is an illustration of a preferred embodiment of the sea-state responsive, double-valued limiter function in the block diagram of FIG. 6.

In the drawings, like reference characters refer to like parts.

Figure 1:
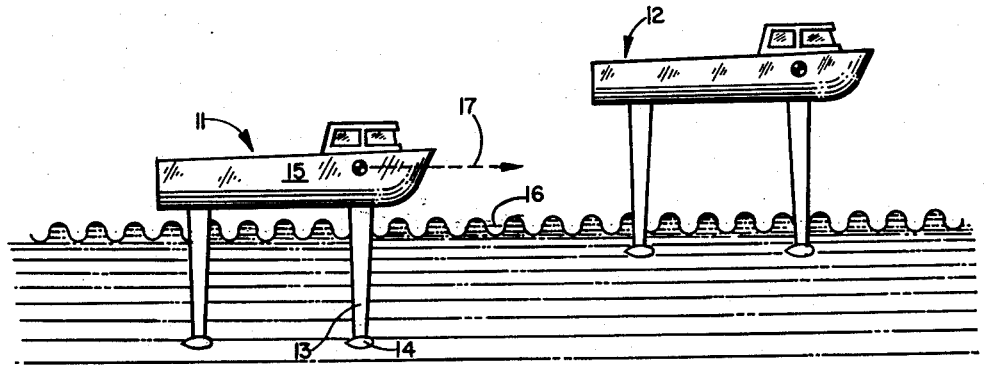
FIG. 1 illustrates two hydrofoil vehicles in an extremely low sea-state.

Referring to FIG. 1, first and second hydrofoil vehicles 11 and 12 are depicted in a sea having a low sea-state, demonstrating the range of permissible heights above the water at which the hull of a hydrofoil vessel may be operated. In smooth water (e.g., zero sea-state conditions), the limits are determined by the length of a strut 13 connecting the vessel's hydrofoil 14 to the hull 15. The lower limit has a minimum which approaches zero, while the upper limit has a maximum equal to the length of such strut less the minimum required foil immersion, and hereinafter referred to as the strut length. As the sea-state increases, the range of permissible values of altitude or height above the water may decrease. Where the relative velocity or frequency of the sea waves to the vehicle is high compared to the dynamic speed of response of the vehicle, including the control system, the altitude control system will maintain the height of the hull above the average level 16 of the water. The resultant level trajectory of the vehicle center of gravity is indicated by the dotted line 17. The permissible minimum height of the hull above the average water level and the permissible minimum depth of the hydrofoil below the average water level (e.g., maximum height of the hull above the water) both necessarily increase as the sea-state increases in order to avoid impact of the hull with the sea, and broaching of the hydrofoils.

Figure 2:
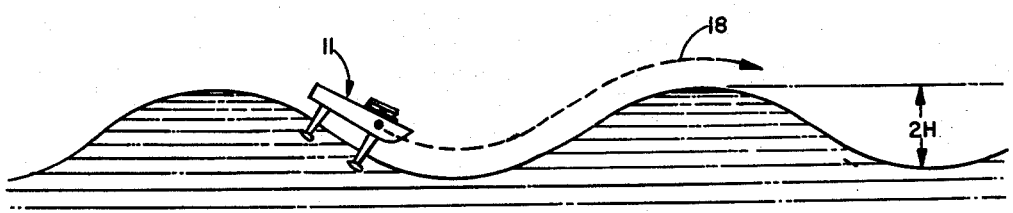
FIG. 2 illustrates a hydrofoil vehicle in relatively extremely slow sea having a high waveheight.

In FIG. 2 is illustrated a hydrofoil vessel 11 in a slow sea having a high waveheight (e.g., waves of high crests and deep troughs, and having a low horizontal velocity component relative to the vehicle along the direction of the vehicle heading). Where the velocity or frequency of the sea-state is thus within the dynamic speed of response of the vehicle, the action of an altitude control system in seeking to maintain the vehicle at a constant height above the water, is to cause the vehicle to follow the contour of the waves. The resultant contour trajectory of the vehicle center of gravity is indicated by the dotted line 18.

If the motion of the sea-state is presumed to be essentially sinusoidal and of only one dominant frequency mode, the vertical trajectory as a function of time may be represented by the equation, $$h(t) = H \sin(\omega t + \theta) \tag{1}$$

where:

$H$ = the vertical amplitude about the average water level (e.g., one-half the waveheight) for the time interval considered,
$\omega$ = frequency in radians per second of the wave front relative to the vehicle heading
$t$ = time interval in seconds
$\theta$ = a phase constant dependent upon the point in time at which an observation is made The inertial acceleration of the vehicle in the vertical direction may be represented as the second derivative of $h(t)$:

$$\ddot{Z} = \omega^2 H \sin(\omega t + \theta) \tag{2}$$

Hence, the inertial acceleration is seen to vary directly with the waveheight and the square of the frequency (e.g., relative sea velocity). In other words, the maintenance of a continuously constant height above water having a sea-state results in no vertical acceleration relative to the undulating surface of such water, but does result in vertical accelerations of the vessel relative to a Newtonian inertial reference or datum (e.g., the average water level line).

Figure 3:
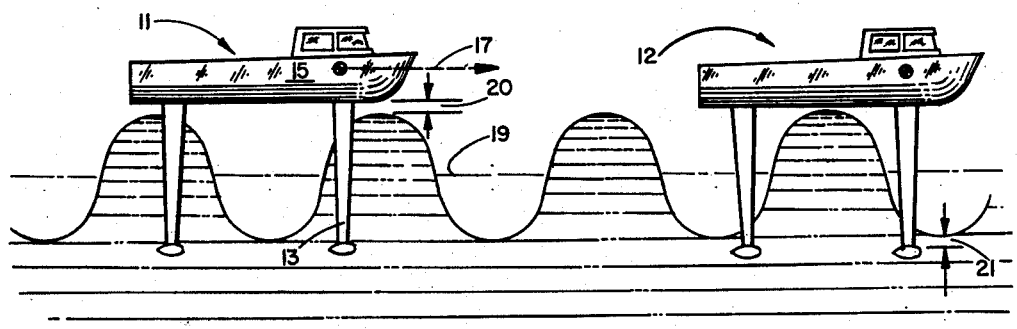
FIG. 3 illustrates two hydrofoil vehicles in a fast sea having a maximum tolerable waveheight.

In FIGURE 3 is depicted first and second hydrofoil vehicles 11 and 12 in a fast sea having a maximum tolerable waveheight, and illustrating the increased lower limit and decreased upper limit for the range of allowable values for altitude control as sea-state increases. In a fast sea, where the relatively horizontal velocity of the sea waves to the vehicle is high compared to the dynamic speed of response of the vehicle, including the control system, the maximum allowable sea-state or waveheight is equal to the length of strut 13. As the vehicle center of gravity follows a level trajectory above the average water level line 19, the hull 15 is required to maintain a vertical minimum clearance 20 to prevent impact, while the hydrofoils 14 are required to maintain a minimum vertical clearance 21 to prevent broaching. Further, the single height reference, $h_c$, above the average water level line 19 capable of satisfying the two required conditions of lower limit to prevent hull impact and upper limit to prevent hydrofoil broaching for such maximum sea-state, is a height equal to one-half the length of strut 13. In other words, as the sea-state of a fast sea increases, the upper and lower limits for altitude control approach each other, and the range of permissible values therebetween becomes smaller.

Figure 4:
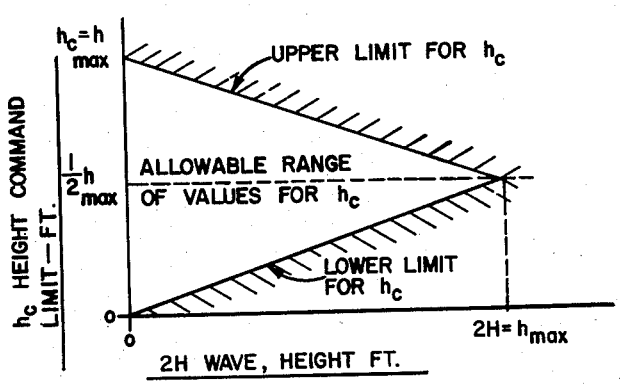
FIG. 4 depicts the upper and lower limits of the reference for a hydrofoil altitude control system as functions of both vehicle geometry limits and sea-state.

In FIGURE 4 is depicted the envelope of permissible ranges of values for altitude control in a fast sea, showing the upper and lower limits drawn as functions of the waveheight 2H, and including each of the two limiting conditions of sea-state illustrated in FIGS. 1 and 3. The lower limit is seen to be zero, and the upper limit equal to the strut length, $h_{max}$ of strut 13, for zero sea-state. The two limits are seen to converge as a linear function of waveheight, at the point, $2H = h_{max}$.

Figure 5:
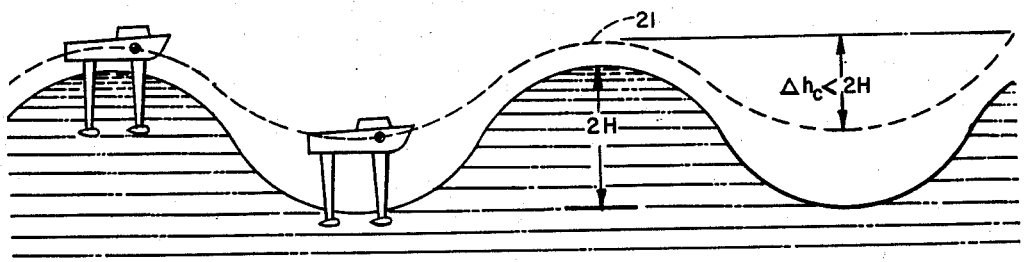
FIG. 5 illustrates a hydrofoil vehicle in a fast sea having a high sea-state.

When the velocity of a high sea-state is within the spectrum of the control system response dynamics, the contouring associated with the altitude control will result in high "g" response. From structural and crew comfort considerations, it is desirable to limit the "g" response while both preventing hull impact with the waves and preventing broaching of the hydrofoils. The maximum amount of allowable wave-contouring for a maximum acceptable vertical acceleration may be computed by the following formula:

$$h_{contour} = \frac{g 32.2 \lambda^2}{2\pi^2 (V \cos \Psi + c)^2} \tag{3}$$

where:

$g$ = maximum allowable vertical acceleration expressed as a ratio of the acceleration due to gravity
$\lambda$ = wave length in feet of the sea-state
$V$ = water speed in feet per second of the vehicle
$c$ = wave velocity in feet per second
$\Psi$ = heading angle of the vehicle relative to the sea-state wave velocity vector In FIGURE 5 is depicted a hydrofoil vehicle 11 in a fast sea having a high sea-state, where the frequency, $$\omega = \frac{(V \cos \Psi + c)}{2\pi\lambda}$$

is within the dynamic response of the vehicle. The amount of contouring indicated for the vehicle center of gravity by dotted line 21, represents the effect of inertial acceleration control used in conjunction with the altitude control system. The resultant double amplitude of the contouring, $\Delta h_c$, is indicated as being less than the waveheight, 2H. The resultant limited contouring and reduced normal accelerations are achieved at the expense of reducing the height or clearance relied upon to prevent broaching and hull impact. In the limit, for a given set of vehicle dynamics, length, and desired "g" limit, a combination of sea-state waveheight and velocity could exist for which the combined control functions of altitude control with "g" limiting could not be concurrently achieved. In such event, a maximum "g" signal could be employed as a switching signal to make the altitude control system inoperative, and to reduce the throttle for the vehicle engines or main propulsion, reducing the vehicle speed below that for hydrofoil action, thereby allowing the vehicle to function as a conventional water-borne hull.

Referring to FIGURE 6-A, a block diagram of a device employing the principles of the invention is illustrated. An adjustable height reference signal $h_c$ from an adjustable reference signal source 30 is fed to a variable double-valued limiter 31. Limiter 31 processes or modifies the amplitude of the reference signal as necessary to prevent either its exceeding a predetermined upper limit or falling below a predetermined lower limit. The processed reference signal, indicative of a desired height above the water, is next compared with the output of a height sensor 32 at summing means 33 to provide a signal indicative of error or deviation from the desired height. Sensor 32 is preferably a high response device, having a flat frequency response characteristic at high frequencies, as well as at low frequencies including zero frequencies, for reasons which will become apparent. In other words, the height sensor should have a flat frequency response from zero frequency up to the highest wave frequency to which the altitude control system is to be subjected.

The altitude error or difference signal output from summing means 33 is fed to a hydrofoil servo actuator 34 for controlling the attitude of the hydrofoils to vary the altitude of the vehicle in such a manner as to cause the altitude error signal to be reduced (e.g., to approach zero). Such actuator may be conventional electrically operated hydraulic apparatus well known to those skilled in the art.

A low pass frequency filter 35 is interposed between summing means 33 and the output of sensor 32. The function of filter 35 is to attenuate vehicle dynamic response to a fast sea and to prevent control signal saturation of the hydrofoil control system due to high frequency components contained in the output of sensor 32. Alternatively, such filter may be interposed between servo 34 and the output of summing means 33 to accomplish the same function (as shown in FIGURE 6–B).

The upper and lower reference signal limits provided by limiter 31 are variable in response to a control signal applied on control line 36 as an input to limiter 31. The control signal on line 36 is provided by the output of a waveheight detector 37 which is responsively connected to the output of height sensor 32 to provide a signal indicative of waveheight. Therefore, the upper and lower limits of double-valued limiter 31 are caused to vary in response to sea-state, elements 31, 32, 35, 36 and 37 being arranged such that the response is in accordance with the relationship depicted in FIG. 4. The waveheight detection function of element 37 is accomplished by means of a high pass frequency filter, having a lower break frequency approximately equal to the upper break frequency of low pass filter 35. Where the control requirements of limiter 31 require a D.-C. control signal, a conventional demodulator is also employed in cooperation with the high pass frequency filter which comprises waveheight detector 37. Alternatively, the input of detector 37 could be responsively connected to the output of summing means 33 to accomplish the same waveheight detection function (as shown in FIGURE 6–B).

Vertical acceleration or "g" limiting is accomplished in conjunction with height control by means of the output of an accelerometer 38 fed to servo 34 for controlling the hydrofoils in such a manner as to cause the vertical acceleration of the vehicle to be reduced. This accelerometer is arranged to provide an indication of the heaving or vertical accelerations experienced by the vessel. The response of the hydrofoil servo 34 to both normal acceleration and height error signals concurrently will prevent reduction of the steady-state height error to a minimum. Therefore, an integrator 39 is responsively connected in parallel between the output of summing means 33 and the input to servo 34 to reduce the steady-state height error, $h_e$, to a minimum. The integrator may be a conventional integrating amplifier or a motor-driven potentiometer or other means well-known in the art for providing an output signal representing the time integral of the output signal from summing means 33. The described parallel connection, as shown in FIGURE 6–A, is preferably employed in order to avoid the dynamically destabilizing effect of an integrator in a servo feedback loop, while minimizing steady-state height error.

It is to be noted that in a slow sea (e.g., low horizontal velocity or low frequency of wave incidence) the height error output from summing means 33 is measured relative to the contour of the waves, while the vertical acceleration output from accelerometer 38 is measured relative to an inertial or Newtonian reference. However, in a fast sea (e.g., the wave velocity represents a frequency above the cutoff frequency of the low-pass filter) the altitude error measurement is made relative to an average water level analogous to an inertial reference. Accordingly, the sum of both height and vertical acceleration signals at the input to servo 34 could be indicative of a neutrally stable or, at best, underdamped second order system response. Therefore, equalization means 40 is interposed to provide signal shaping of the output from accelerometer 38 to provide an output which is a function of both vertical acceleration and the first integral of vertical acceleration. Since the first integral of vertical acceleration is a component of vertical velocity, such first integral serves to provide additional damping of the underdamped oscillatory or second-order height control system. Such signal shaping to achieve an output indicative of both acceleration and the first integral of acceleration may be obtained by conventional electrical network means well understood in the art, such as described in Electronic Analog Computer by Korn & Korn, 2nd edition, McGraw-Hill (1956), and is indicated only schematically by element 40. For a D.-C. acceleration signal such means might comprise, for example, a high-gain operational amplifier with capacitive feedback impedance and a series input impedance comprising a resistor and capacitor in parallel.

An accelerometer switch 41 is responsively connected to the output of accelerometer 38 to provide a switching control signal in response to accelerations in excess of a predetermined magnitude. Such signals will occur under a combined sea-state condition of waveheight and sea velocity which cause excessive contouring by a vehicle with automatic altitude control. Such switching signals may be fed to hydrofoil servo 34 and an engine throttle servo 42 to cause the hydrofoil effect to become inoperative by reducing the vehicle speed, whereby the vehicle will function in the manner of a conventional waterborne vehicle.

Referring to FIGURE 6–B, a block diagram of an alternative system employing the principles of the invention is illustrated, and comprises essentially the same elements as that in FIGURE 6–A, but with differences as noted. In the system of FIGURE 6–B, each of elements 36 and 37 is responsively connected to the output of element 33, rather than to the output of element 32. Since the reference signal from element 30 in FIGURE 6–A and FIGURE 6–B is of limited spectral content (e.g., essentially a D.-C. signal), it has no effect upon the output of the waveheight detector 37, nor is the reference signal itself affected by the low-pass filter 35. Therefore, the system of FIGURE 6–B is functionally equivalent to that of FIGURE 6–A, in that the spectral components of the output from element 32 are not changed substantially at the output of summing means 33 prior to being processed by elements 36 and 37.

Referring to FIGURE 7, a preferred embodiment of the principles of the invention is shown. An adjustable height reference signal is provided by signal source 30, comprising a manually-adjusted D.-C. excited potentiometer 50, and is fed to an input terminal 51 of a variable double-valued D.-C. signal limiter 31. The D.-C. limiter comprises a first resistor 52 and first diode 53 connected in series circuit between input terminal 51 and an output terminal 54, one end of said first resistor being connected to the input terminal, and one electrode of the first diode being connected to the output terminal. A second resistor 55 and diode 56 are connected in series circuit between output terminal 54 and ground, one end of the second resistor being connected to ground and one electrode of the second diode being connected to the output terminal, the anode of one of said first and second diodes being connected to the cathode of the other of said first and second diodes. A third resistor 57 and third diode 58 are connected in series between a limiter-control circuit input terminal 59 and output terminal 54, one end of the resistor being connected to control terminal 59, and the third diode being connected to the output terminal 54 in back-to-back connection with diode 53.

A comparison circuit 60 is responsively connected to input terminal 59 and to a bias voltage $-V_0$ indicative of a maximum value for a variable upper limit corresponding to the length of strut 13 in FIGURE 1. The output of comparison circuit 60 is connected between second diode 56 and second resistor 55 for back-biasing such diode. Such comparison circuit may be comprised of a summing amplifier including sign changing means as necessary to properly achieve the back-biasing function. Such structure is well known in the art and is only indicated schematically by element 60 in FIGURE 7. A D.-C. control signal of opposite sense to voltage $-V_0$ at element 60 and indicative of sea-state is applied to input terminal 59 of variable double-valued limiter 31. Such signal is obtained by means of feeding the output of a height sensor 32 to a sea-state detector 37, and connecting the output of sea-state detector 37 to input terminal 59 by means of control signal line 36.

Sensor 32 may consist of any suitable high response height sensor having a flat frequency response out to the wave frequencies to which a hydrofoil altitude control system will be subjected. Such sensors may consist of radar devices or sonar devices such as are described in U.S. Patent 2,890,671 issued June 16, 1959 to Hobday for example, which are well known in the art.

Sea-state detector 37 may be comprised of a high-pass frequency filter and rectifier, scaled to provide a D.-C. signal indicative of waveheight by means well understood in the art.

The illustrated embodiment of the limiter device described is a D.-C. device; however, it is understood that such embodiment is exemplary only and that the device of the invention is not limited to D.-C. circuitry.

In the embodiment of limiter 31 illustrated in FIG. 7, exemplary values of the circuit parameters employed are: like resistance values for first resistor 52 and second third resistor 57, a resistance for second resistor 55 equal to one-tenth that for either element 52 or 57, a negative 10 volt D.-C. bias for $V_0$ at element 60, corresponding to strut length of 10 feet, a detector gain level of 1 volt per 2 feet of waveheight excursion (e.g., crest to trough), and a gain of minus unity in the summer-amplifier means 60.

In operation of the exemplary embodiment of limiter 31 illustrated in FIG. 7, output terminal 54 cannot maintain signals applied at input terminal 51 above the back-bias potential upon diode 56 (as applied by element 60) because the back-bias potential, when exceeded by that of an input signal on terminal 51, allows diode 56 to be shorted to ground through the relatively low impedance of resistor 55. Therefore, element 60 together with elements 55 and 56 provide an upper limit upon an output signal appearing on terminal 54.

Such upper limit will decrease in response to an increase in the control signal appearing on control terminal 59 in response to increasing sea-state. Such increase in control may result for example (1) due to an increase in the relative wave velocity or frequency from a low frequency to a frequency within the band pass of the high pass frequency filter of waveheight detector 37 or (2) due to an increase in waveheight, or (3) both. As the control signal level on terminal 59 increases from, say, null or zero, thereby opposing the bias signal $V_0$ at the input to element 60, the output level from element 60 decreases. As the output level of element 60 decreases, the bias on diode 56 decreases, thereby decreasing the upper limit upon output signals on terminal 54.

Output terminal 54 in FIGURE 7 cannot maintain signals at a level below the potential at diode 58, because such potential back-biases diode 53, thereby preventing conduction of reference signals from input terminal 51 to output terminal 54. Instead, the potential on diode 58 will appear on terminal 54. Therefore, elements 57 and 58 provide a lower limit upon an output signal appearing on terminal 54. As the control signal level on terminal 59 increases the back-bias on diode 53 increases, thereby increasing the lower limit upon output signals on terminal 54.

Since both the upper limit decreases and the lower limit increases in response to an increase in the control signal amplitude (e.g., the output signal from waveheight detector 37), it is to be seen that the permissible range of output signals on terminal 54 of limiter 31 decreases as sea-state increases.

It will be seen that the invention provides improved limiting means for achieving operational safety of a hydrofoil altitude control system.

Although the invention has been described and illustrated in detail, it is to be clearly understood that the same is by way of illustration and example only, and is not to be taken by way of limitation, the spirit and scope of this invention being limited only by the terms of the appended claims.

We claim:
1. In the automatic height control system for a waterborne vehicle having a hull and hydrofoils, variable means for generating a reference signal representing a height at which it is desired that the vehicle travel above the water, a sea-state detector for producing a second signal indicative of sea-state, means responsive to said second signal for automatically limiting such reference signal for preventing contact of the hull with the sea and broaching of the hydrofoils, a vertical accelerometer, and automatic means responsive to said accelerometer for reducing the vertical acceleration response of said control system to deviations of vehicle height from said reference height.

2. In an automatic height control system for a waterborne vehicle having a hull and hydrofoils, variable means for generating a reference signal representing a height at which it is desired that the vehicle travel above the water, a sea-state detector for producing a second signal indicative of sea-state and means for automatically limiting such reference signal for preventing contact of the hull with the sea and broaching of the hydrofoils, said limiting means including means for providing upper and lower signal limits which vary in accordance with sea-state in response to said second signal.

3. In an automatic height control system for a hydrofoil vehicle having a hull and hydrofoils, means for preselecting a command reference signal to which the vehicle is to be controlled, a sea-state detector for producing a second signal indicative of sea-state limiting means responsive to said second signal for automatically limiting such reference signal as a function of both sea-state and the geometrical limits of the vehicle, a vertical accelerometer means responsive to said accelerometer for reducing the vertical acceleration of the vehicle, and automatic means responsive to said accelerometer for shutting down the hydrofoil action and control system of such vehicle when such limits on both height and vertical acceleration cannot be satisfied concurrently.

4. In an automatic height control system for a hydrofoil vehicle having a hull and hydrofoils, means for preselecting a command reference signal to which the vehicle is to be controlled, a sea-state detector for producing a limiter-control signal indicative of sea-state and limiting means responsive to said limiter-control signal for automatically limiting such reference signal as a function of both sea-state and the geometrical limits of the vehicle.

5. The device claimed in claim 4 wherein said limiting means comprises a double-valued D.C. signal limiter comprising a first resistor and first diode connected in series circuit between an input terminal and an output terminal of said limiter, one end of said first resistor being connected to said input terminal and one electrode of said first diode being connected to said output terminal, a second resistor and second diode connected in series circuit between said output terminal and ground, one end of said second resistor being connected to ground and one electrode of said second diode being connected to said output terminal, the anode of one of said first and second diodes being connected to the cathode of the other of said first and second diodes, a third resistor and third diode connected in series between a limiter-control signal input terminal and said output terminal, one end of said third resistor being connected to said limiter-control signal input terminal, said third diode being connected to said output terminal in back-to-back connection with said first diode, a comparison means for comparing said limiter control signal and a signal indicative of a maximum upper limit, an input of said comparison means being connected to said limiter-control signal input terminal, the output of said comparison means being connected between said second diode and said second resistor for back-biasing of said second diode.

6. The device claimed in claim 5 wherein the signal indicative of maximum upper limit is a measure of the hydrofoil vehicle strut dimension between the bottom of the hull and the top of the hydrofoil.

7. In an automatic height control system for a hydrofoil vehicle having a hull and hydrofoils, means for preselecting a command reference signal to which the vehicle is to be controlled, a sea-state detector for producing a signal indicative of sea-state limiting means responsive to said sea-state signal for automatically limiting such reference signal as a function of both sea-state and the geometrical limits of the vehicle, said limiting means comprising: means for providing upper and lower limits to said reference signal, and control means for causing said upper and lower limits to approach each other as a linear function of said sea-state signal.

8. In an automatic height control system for a hydrofoil vehicle, the combination of means for preselecting a command reference to which the vehicle is to be controlled, double-valued limiting means for automatically limiting said reference to prevent contact of the vehicle with the sea and broaching of the hydrofoils, and means for reducing the vertical acceleration of such vehicle in response to said control system to within a predetermined limit.

9. In an automatic height control system for a hydrofoil vehicle, the combination of means for pre-selecting a command reference to which the vehicle is to be controlled, double-valued limiting means for automatically limiting said reference to prevent contact of the vehicle with the sea and broaching of the hydrofoils, means for reducing the vertical acceleration of such vehicle in response to said control system to within a predetermined limit, and automatic means for shutting down the hydrofoil action and control system of such vehicle when such limits on both height and vertical acceleration cannot be satisfied concurrently.

10. Means for providing variable double-valued limiting of a unipolar output signal, comprising limiting means for providing upper and lower limits to such output signal, and control means adapted to be connected to a source of a limiter control signal for causing said upper and lower limits to approach each other as said limiter control signal is increased.

11. A double-valued D.C. signal limiter comprising a first resistor and first diode connected in series circuit between an input terminal and an output terminal of said limiter, one end of said first resistor being connected to said input terminal and one electrode of said first diode being connected to said output terminal, a second resistor and second diode connected in series circuit between said output terminal and ground, one end of said second resistor being connected to ground and one electrode of said second diode being connected to said output terminal, the anode of said first and second diodes being connected to the cathode of the other of said first and second diodes, a third resistor and third diode connected in series between a limiter-control signal input terminal and said output terminal, one end of said third resistor being connected to said control terminal, said third diode being connected to said output terminal in back-to-back connection with said first diode, comparison means for comparing a limiter control signal and a signal indicative of a maximum upper limit, an input of said comparison means being connected to said control signal input terminal, the output of said comparison means being connected between said second diode and said second resistor for back-biasing of said second diode.

12. In an automatic height control system for a waterborne vehicle having a hull and hydrofoils, the combination of a height sensor, variable signal means for generating a height reference signal, summing means for comparing the output from said height sensor with said reference signal, servo actuation means responsively connected to said summing means for controlling a set of hydrofoil control surfaces, low frequency pass filter means interposed between said sensor and said servo means to provide protection against saturation and unstable response of said servo means to sea-state signal components in the sensor output, a sea-state detector connected to the output of said sensor to provide a signal indicative of sea-state, and variable limiter means interposed between said variable signal means and said summing means, said limiter means being responsively connected to the output of said sea-state detector for automatically limiting such signal for preventing contact of the hull with the sea and broaching of the hydrofoils.

13. The combination in claim 12 in which the sea-state detector comprises a high frequency pass filter and demodulator.

14. In an automatic height control system for a waterborne vehicle having a hull and hydrofoils, the combination of a height sensor; variable signal means for generating a height reference signal; comparison means for comparing the output from said height sensor with said reference signal; servo actuation means responsively connected to said comparison means for controlling a set of hydrofoil control surfaces; low frequency pass filter means interposed between said sensor and said servo means to provide protection against saturation and unstable response of said servo means to sea-state signal components in the sensor output; a sea-state detector connected to the output of said sensor to provide a signal indicative of sea-state; and variable limiter means interposed between said variable signal means and said comparison means for providing variable upper and lower limits for said height reference signal, said upper limit having a maximum value indicative of the geometrical limits of the vehicle, the lower limit having a minimum value of zero, said limiter means being responsively connected to the output of said sea-state detector for causing said upper and lower limits to approach each other in a predetermined manner 15. The combination in claim 14 in which the sea-state detector comprises a high frequency pass filter and demodulator.

16. A control system for a hydrofoil vehicle comprising a source of control signal, means for generating a signal indicative of waveheight, variable limiter means for limiting said control signal in accordance with the output of said waveheight signal means, a vehicle height sensor, and summing means responsive to said limiter and sensor for deriving an error signal, and vehicle control mechanism responsive to said error signal.

17. In a control system for hydrofoil vehicle, a double-valued signal limiter comprising output means for providing an output signal responsive to an input signal, limiting means for providing an upper limit to the output signal, means for providing a lower limit to such output signal, a limiter control signal, and control means for causing the difference between the values of said upper and lower limits to approach zero as a linear function of increases of said limiter control signal.

18. In a control system for hydrofoil vehicle, means for providing variable double-valued limiting of an output signal comprising means linearly responsive to an input signal for providing an output signal, limiting means for providing upper and lower limits to such output signal, the maximum value of such upper limit being adjustable and the lower value of such lower limit being zero, a limiter control signal, and control means for causing said upper and lower limits to approach each other as said limiter control signal is increased.

19. In a control system for hydrofoil vehicle, means for providing variable double-valued limiting of an output signal, comprising limiting means for providing upper and lower limits to said output signal, a limiter control signal, and control means for causing said limits to approach each other in response to increases of said limiter control signal.

20. In a control system for hydrofoil vehicle, a double-valued D.C. signal limiter comprising a first resistor and first diode connected in series circuit between an input terminal and an output terminal of said limiter, one end of said first resistor being connected to said input terminal and one electrode of said first diode being connected to said output terminal, a second resistor and second diode connected in series circuit between said output terminal and ground, one end of said second resistor being connected to ground and one electrode of said second diode being connected to said output terminal, the anode of said first and second diodes being connected to the cathode of the other of said first and second diodes, a third resistor and third diode connected in series between a limiter-control signal input terminal and said output terminal, one end of said third resistor being connected to said control terminal, said third diode being connected to said output terminal in back-to-back connection with said first diode, comparison means for comparing a limiter control signal and a signal indicative of a maximum upper limit, an input of said comparison means being connected to said control signal input terminal, the output of said comparison means being connected between said second diode and said second resistor for back-biasing of said second diode.

References Cited by the Examiner

UNITED STATES PATENTS

| | | | |
|---|---|---|---|
| 2,139,467 | 12/38 | Roosenstein | 328—171 |
| 2,420,374 | 5/47 | Haughton | 323—9 |
| 2,550,220 | 4/51 | Bussei | 114—66.5 |
| 2,833,980 | 5/58 | Hedgcock | 323—81 |
| 2,858,433 | 10/58 | Rector | 323—9 |
| 2,890,671 | 6/59 | Hobday | 114—66.5 |
| 2,960,959 | 11/60 | Chadwich et al. | 114—126 |
| 2,974,269 | 3/61 | Cooper | 323—9 |
| 3,006,307 | 10/61 | Johnson | 114—66.5 |
| 3,023,355 | 2/62 | Thorsen | 323—9 |

FOREIGN PATENTS

| | | |
|---|---|---|
| 564,182 | 2/58 | Belgium. |

FERGUS S. MIDDLETON, *Primary Examiner.*
MILTON BUCHLER, *Examiner.*